United States Patent
Ganu et al.

(10) Patent No.: US 10,602,427 B2
(45) Date of Patent: *Mar. 24, 2020

(54) INFRASTRUCTURE-ASSISTED CLIENT MANAGEMENT USING SYNTHESIZED BEACON REPORTS

(71) Applicant: Hewlett Packard Enterprise Development LP, Houston, TX (US)

(72) Inventors: Sachin Ganu, San Jose, CA (US); Partha Narasimhan, Santa Clara, CA (US); Pradeep Iyer, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,629

(22) Filed: Mar. 20, 2018

(65) Prior Publication Data

US 2018/0213467 A1 Jul. 26, 2018

Related U.S. Application Data

(63) Continuation of application No. 13/195,720, filed on Aug. 1, 2011, now Pat. No. 9,936,441.

(51) Int. Cl.
*H04W 48/02* (2009.01)
*H04W 48/20* (2009.01)
*H04W 12/08* (2009.01)

(52) U.S. Cl.
CPC .......... *H04W 48/02* (2013.01); *H04W 12/08* (2013.01); *H04W 48/20* (2013.01)

(58) Field of Classification Search
CPC ...... H04W 12/08; H04W 48/02; H04W 48/20
See application file for complete search history.

(56) References Cited

U.S. PATENT DOCUMENTS

| | | | |
|---|---|---|---|
| 5,901,362 A | 5/1999 | Cheung et al. | |
| 7,181,211 B1 | 2/2007 | Phan-Anh | |
| 7,230,920 B1 | 6/2007 | Stratigakis | |
| 7,340,247 B1 * | 3/2008 | O'Hara, Jr. | H04W 40/246 370/338 |
| 7,929,508 B1 * | 4/2011 | Yucek | H04W 72/06 370/338 |

(Continued)

OTHER PUBLICATIONS

Supplemental Notice of Allowability, U.S. Appl. No. 11/305,910, dated Mar. 8, 2011, pp. 1-6.

(Continued)

*Primary Examiner* — Saad A. Waqas
(74) *Attorney, Agent, or Firm* — Hewlett Packard Enterprise Patent Department

(57) ABSTRACT

Infrastructure-based client management uses synthesized beacon reports to effect client association with APs in a wireless digital network. Beacon reports are synthesized by having a plurality of APs in the network collect client reports and send those reports to a report process on the network. The report process accumulates client reports from the plurality of APs and selects one or more candidate APs to support a client. Selection may be made on reported SNR, AP loading, channel loading, AP characteristics, or a combination. The report process may produce blacklists and optionally whitelists for use by APs to use in processing client probe and connection requests.

17 Claims, 1 Drawing Sheet

(56) References Cited

U.S. PATENT DOCUMENTS

| | | | |
|---|---|---|---|
| 7,948,953 B2 | 5/2011 | Melkote et al. | |
| 8,254,481 B1 | 8/2012 | McCloskey et al. | |
| 8,363,617 B2 | 1/2013 | Meyer | |
| 8,401,554 B2 | 3/2013 | Melkote et al. | |
| 8,483,169 B2 | 7/2013 | Melkote et al. | |
| 8,599,793 B2 | 12/2013 | Thomson | |
| 2003/0091006 A1 | 5/2003 | Peltola | |
| 2003/0112766 A1 | 6/2003 | Riedel et al. | |
| 2003/0134640 A1 | 7/2003 | Kim et al. | |
| 2003/0224797 A1 | 12/2003 | Kuan et al. | |
| 2004/0047324 A1 | 3/2004 | Diener | |
| 2004/0125923 A1 | 7/2004 | See et al. | |
| 2004/0204114 A1* | 10/2004 | Brennan | H04B 7/04 455/562.1 |
| 2004/0223470 A1* | 11/2004 | Smith | H04L 63/10 370/332 |
| 2004/0246922 A1 | 12/2004 | Ruan et al. | |
| 2004/0248610 A1 | 12/2004 | Chan | |
| 2005/0068928 A1 | 3/2005 | Smith et al. | |
| 2005/0130650 A1 | 6/2005 | Creamer et al. | |
| 2005/0201330 A1 | 9/2005 | Park et al. | |
| 2005/0271009 A1 | 12/2005 | Shirakabe et al. | |
| 2006/0067290 A1 | 3/2006 | Miwa et al. | |
| 2006/0072502 A1 | 4/2006 | Crandall et al. | |
| 2006/0073827 A1 | 4/2006 | Vaisanen et al. | |
| 2006/0128364 A1 | 6/2006 | Costa-Requena et al. | |
| 2006/0128392 A1 | 6/2006 | Turina et al. | |
| 2006/0135068 A1 | 6/2006 | Jaakkola et al. | |
| 2006/0165103 A1 | 7/2006 | Trudeau et al. | |
| 2006/0187864 A1 | 8/2006 | Wang et al. | |
| 2006/0223503 A1 | 10/2006 | Muhonen et al. | |
| 2006/0285507 A1 | 12/2006 | Kinder et al. | |
| 2007/0014267 A1 | 1/2007 | Lam et al. | |
| 2007/0025371 A1 | 2/2007 | Krantz et al. | |
| 2007/0026856 A1 | 2/2007 | Krantz et al. | |
| 2007/0076671 A1* | 4/2007 | Winget | H04L 63/08 370/338 |
| 2007/0104126 A1* | 5/2007 | Calhoun | H04W 28/26 370/328 |
| 2007/0105623 A1 | 5/2007 | Tanaka et al. | |
| 2007/0127417 A1* | 6/2007 | Kalika | H04N 21/4126 370/338 |
| 2007/0143391 A1 | 6/2007 | Nakamura | |
| 2007/0201404 A1 | 8/2007 | Cheon et al. | |
| 2007/0249386 A1* | 10/2007 | Bennett | H04N 21/4126 455/550.1 |
| 2008/0057934 A1 | 3/2008 | Sung et al. | |
| 2008/0070586 A1 | 3/2008 | Kermoal et al. | |
| 2008/0261602 A1 | 10/2008 | Livneh | |
| 2008/0318576 A1 | 12/2008 | So et al. | |
| 2009/0070694 A1 | 3/2009 | Ore et al. | |
| 2009/0316655 A1 | 12/2009 | Prakash et al. | |
| 2010/0069072 A1 | 3/2010 | Gogic et al. | |
| 2010/0118830 A1 | 5/2010 | Stephenson et al. | |
| 2010/0144365 A1 | 6/2010 | Pan et al. | |
| 2010/0322198 A1* | 12/2010 | Friday | H04W 48/20 370/332 |
| 2010/0330943 A1* | 12/2010 | Hoepfner | H04B 17/318 455/226.2 |
| 2011/0087882 A1* | 4/2011 | Kuo | G06F 21/57 713/156 |
| 2011/0096738 A1* | 4/2011 | Choi | H04B 7/0452 370/329 |
| 2011/0292898 A1* | 12/2011 | Wu | H04W 72/082 370/329 |
| 2012/0051353 A1 | 3/2012 | Aragon et al. | |
| 2012/0052900 A1 | 3/2012 | Liu et al. | |
| 2012/0128090 A1 | 5/2012 | Seok | |
| 2012/0210001 A1 | 8/2012 | Ryerson et al. | |
| 2012/0282968 A1 | 11/2012 | Toskala et al. | |
| 2012/0322481 A1 | 12/2012 | Laroche et al. | |
| 2013/0036188 A1 | 2/2013 | Ganu et al. | |
| 2013/0041981 A1 | 2/2013 | Kim et al. | |
| 2013/0095863 A1* | 4/2013 | Dhanda | H04W 48/02 455/458 |
| 2013/0265943 A1 | 10/2013 | Melkote et al. | |
| 2013/0308447 A1 | 11/2013 | Cheng et al. | |
| 2014/0130149 A1 | 5/2014 | Tripp | |
| 2014/0211756 A1 | 7/2014 | Bontu et al. | |
| 2014/0241296 A1 | 8/2014 | Shattil | |
| 2015/0172998 A1 | 6/2015 | Tervonen et al. | |

OTHER PUBLICATIONS

Notice of Allowance, U.S. Appl. No. 11/305,910, dated Jan. 20, 2011, pp. 1-15.
Non-Final Office Action, U.S. Appl. No. 13/069,218, dated Feb. 15, 2012, pp. 1-25.
Non-Final Office Action, U.S. Appl. No. 11/305,910, dated Jan. 14, 2009, pp. 1-21.
Non-Final Office Action, U.S. Appl. No. 11/305,910, dated Dec. 10, 2009, pp. 1-26.
Non-Final Office Action in U.S. Appl. No. 13/195,720 dated May 8, 2014. 19 pages.
Non-Final Office Action in U.S. Appl. No. 13/195,720 dated Feb. 8, 2013, 15 Pgs.
Ganu, et al.; "Non-Final Office Action issued in U.S. Appl. No. 15/138,663" dated Nov. 17, 2016; 11 pages.
Final Office Action, U.S. Appl. No. 11/305,910, dated Oct. 5, 2010, pp. 1-21.
Final Office Action, U.S. Appl. No. 11/305,910, dated Jul. 21, 2009, pp. 1-25.
Final Office Action in U.S. Appl. No. 13/195,720 dated Jan. 27, 2015. 19 pages.
Final Office Action in U.S. Appl. No. 13/195,720 dated Aug. 16, 2013. 18 pages.

\* cited by examiner

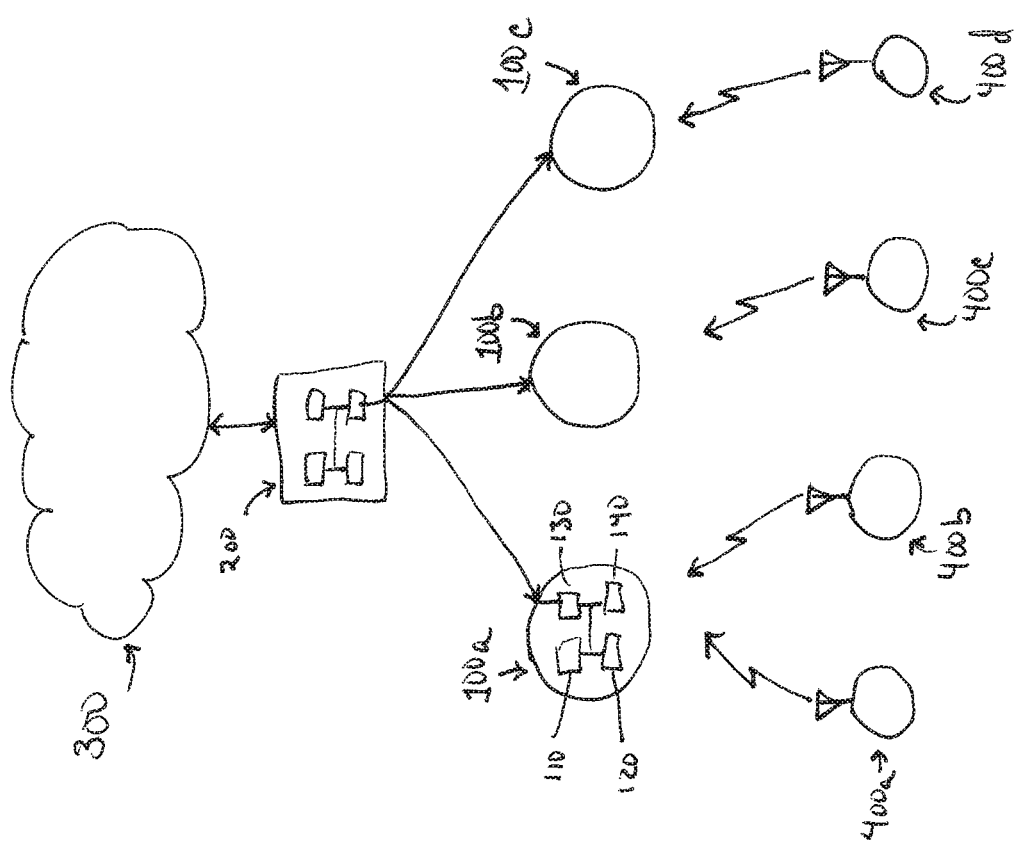

INFRASTRUCTURE-ASSISTED CLIENT MANAGEMENT USING SYNTHESIZED BEACON REPORTS

This application is a Continuation of U.S. patent application Ser. No. 13/195,720 filed on Aug. 1, 2011 (to be issued as U.S. Pat. No. 9,936,441 on Apr. 3, 2018), the content of which are incorporated herein by reference in its entirety. The Applicant hereby rescinds any disclaimer of claim scope in the parent application or the prosecution history thereof and advices the USPTO that the claims in this application may be broader than any claim in the parent application.

BACKGROUND OF THE INVENTION

The present invention relates to wireless digital networks, and more particularly, to the problem of client association management.

Wireless local area networks (WLANs) are becoming ubiquitous. Particularly in locations such as school and businesses, there may be a number of wireless access points (APs) present in an area, each providing basic service sets (BSS) to associated clients (known in the standards as stations, STA).

The challenge in managing the WLAN is to manage client association, providing the "best" association between client (STA) and AP providing a BSS.

There are a bewildering number of mechanisms for assisting with this process. Some infrastructure vendors have client software which enables coordination between APs and clients to negotiate a suitable BSS for association. However, most client devices, particularly older client devices, lack this software support. In such cases, the 802.11 infrastructure, the WLAN, has to infer the information about the client's view of the network, and select the proper candidate BSS to handle the client.

The IEEE 802.11k standard (IEEE Std. 802.11k-2008), incorporated herein by reference in its entirety, has proposed different mechanisms on both the 802.11 client and the 802.11 infrastructure so that they are able to co-operatively establish associations with the best BSSID in the client's vicinity. This is done using the 802.11k Beacon Report Information Element that is sent by the 802.11 client (STA) to the infrastructure (AP) in response to a Beacon Request from the AP. The Beacon Report consists of a list of BSS and their properties that the client is able to sense in its vicinity. This provides a standardized mechanism to enable the 802.11 infrastructure to take into account the client's network view to appropriately serve the client via the best available AP/BSS.

Since this standard is relatively new and the implementation optional, there are only a few client devices and drivers that support sending Beacon Reports. In the absence of this information, the infrastructure has to infer this based on observations of client traffic.

What is needed is a method of synthesizing Beacon Reports and using these synthesized reports to assist with the proper association of clients to APs in a WLAN.

BRIEF DESCRIPTION OF THE DRAWINGS

The invention may be best understood by referring to the following description and accompanying drawings that are used to illustrate embodiments of the invention in which:

FIG. 1 shows devices in a network.

DETAILED DESCRIPTION

Embodiments of the invention relate to methods of infrastructure-based client management. Access points (APs) maintain tables of client information, sending this client information to a report process, the report process maintaining a table of all client information received from supported APs. The report process may run on a controller associated with the APs, a dedicated host on the network, or it may run on one of the APs. The report process processes the client reports to determine a candidate AP or set of APs for a client and forwards this information to APs in the group. The information forwarded to APs in the group may be in the nature of blacklist reports to APs instructing APs not to associate the client to the AP. The information forwarded to APs in the group may be in the nature of whitelist reports indicating that APs are to respond to the client. APs use these reports to steer association of clients.

According to the present invention and as shown in FIG. 1, access points (APs) 100*a*, 100*b*, 100*c* communicate with controller 200, which in turn communicates with network 300. APs 100 support wireless client devices 400*a*, 400*b*, 400*c*, 400*d*.

As is understood in the art, APs 100 are purpose-built digital devices, each containing a processor 110, memory hierarchy 120, and input-output interfaces 130 140. In one embodiment of the invention, a MIPS-class processor 110 such as those from Cavium or RMI is used. Other suitable processors, such as those from Intel, ARM, or AMD may also be used. The memory hierarchy 120 traditionally comprises fast read/write memory for holding processor data and instructions while operating, and nonvolatile memory such as EEPROM and/or Flash for storing files and system startup information. Wired interfaces 130 are typically IEEE 802.3 Ethernet interfaces, used for wired connections to other network devices such as switches, or to a controller. Wireless interfaces 140 are typically IEEE 802.11 wireless interfaces. In one embodiment of the invention, access points 100 operate under control of a LINUX operating system, with purpose-built programs providing host controller and access point functionality. Controller 200 is a similar purpose-built digital device containing a similar hierarchy of processor, memory, and input-output interfaces.

Similarly, wireless clients 400*a*, 400*b*, 400*c*, 400*d* are digital devices each containing a processor, memory, wireless interface, and other interfaces as needed. Examples of wireless clients include but are not limited to handheld wireless devices such as tablets, bar-code scanners, Wi-Fi phones or communicators, computers including netbooks, notebooks, laptops, and desktop computers, as well as wireless infrastructure devices such as cameras, scales, and instruments.

According to the present invention, synthesis of Beacon Reports begins with gathering client information from the WLAN infrastructure. APs maintain a client table which is shared among the radios in the AP. As is known to the art, an AP may contain multiple radio transceivers, for example, for 2.4 GHz and 5 GHz wireless bands. Upon receiving a probe request or Auth from a client device, the AP measures the signal to noise ratio (SNR) or equivalent of the received frame. If this is a new client, as identified by the client MAC address in the received frame, an entry is added to the client table including at least the client MAC, the SNR of the received frame, and a timestamp. Other information such as channel and band may also be recorded. If the client MAC already existed in the table, entries for that client MAC are updated.

The client table in the AP may be of limited size, for example 128 entries, with entries aged out as the table fills.

The AP sends a client report to the report process. As an example, this may occur periodically, such as every second.

Sending a client report may be triggered on events, such as updates or additions to the client table, or a combination of time and events. The client report contains at least a list of client MAC addresses and the associated SNRs or equivalent, and may include additional information such as timestamp, channel and/or band. The client report may also contain AP specific information such as channel noise floors, channel loading, AP capabilities, and the like.

This client reporting process is repeated by the APs 100a, 100b, 100c, 100d on the network.

According to the invention, a report process is present on the network. The report process may be hosted by controller 200, for example, or if no controller is present in the network, the report process may be hosted by one of the APs 100. The report process may be also present on a dedicated host on the network. The location of the report process does not matter so long as it is capable of receiving reports from APs and sending data back to those APs.

The report process maintains a client reports table for aggregating client reports received from APs. Each table entry contains a client MAC address and data for different APs, with multiple APs per client. The data per AP may be as simple as SNR plus timestamp, or may include additional information such as channel number and/or band, and other dedicated AP information such as noise floor, AP capabilities, AP loading, and the like. As client reports are received from APs, the report process updates the table entry for that client and the SNR or equivalent from the particular AP with its timestamp. New client entries are created as needed. In this manner an entry for a single client will contain SNR reports from multiple APs, each SNR report having an associated timestamp.

The client reports table may also be limited in size, such as 4096 entries. The specific implementation of the client reports table will depend on the processor architecture and memory capacity of the device.

According to the invention, the client reports table may be used in determining a candidate AP or set of APs for a particular client. Data in the client reports table may be evaluated in different ways to determine what is best.

As an example, for a given client, find the AP/BSS which reported the strongest SNR from that client. This SNR weighting may be optionally time-weighted so that only recent SNR values, within a predetermined period, are used and values older in time are ignored. Such a selection may result in a single AP/BSS being identified, or a list of the top n APs/BSS may be identified.

In another example where channel utilization is available to the report process, such as through inclusion in the client reports, or separate tracking of channel utilization, the AP/BSS which is least loaded may be selected. Load may be measured in terms of the number of clients associated with a particular AP, and/or channel utilization reported. Similarly, AP noise floor may be used or included in such a calculation.

In another similar example, the AP/BSS on a suitable band (2.4 GHz vs. 5 GHz) for the client is selected. This selection may be based on characteristics such as band or channel loading, noise floor, AP characteristics such as supported bandwidth, or the like. If, for example, a client has only reported SNRs for one band, it can be assumed that this client is single-band only. Often band capability may be inferred by examining the OUI portion of the client MAC address. Similarly, an AP which is operating high bandwidth channels would not be a good candidate for a client device which only supports older legacy 802.11b modes.

In another example, for clients which have recorded SNRs of APs across different channels and different bands, one or more candidate APs/BSS may be selected using a combination of the aforementioned criteria.

In another embodiment, candidate APs may be selected on the basis of policy. As an example, policy may allocate devices to different APs based on device type, which may be inferred from the OUI-portion of the client MAC address, as well as from other client characteristics. Handheld devices such as smart phones and tablets may be directed to one group of APs and laptops to another set of APs. Similarly, devices capable of high-bandwith modes may be directed to APs which support those high-bandwidth modes, while lower-bandwidth devices are directed away from those high-bandwidth APs. Other policy-based decisions may be based on location, on time of day, or other criteria.

Further according to the invention, upon receiving a client update from an AP, the report process updates the set of best AP/BSS candidates for all clients which are associated with an AP and sends a report to that AP for the AP to use in client association.

In one embodiment of the invention, the report process produces blacklist reports for each AP. Examining each client, if the currently associated AP is not one of the candidate APs; BSS, then the report process includes that particular client information (the client MAC address) in the blacklist report for that AP. The report process repeats this procedure for all clients associated to the AP and then sends a client blacklist report to the AP. This client blacklist report may be sent to the AP as example in response to the client update received from the AP.

In this embodiment, each AP maintains a blacklist table. This table may be of limited size, such as 128 entries, and contains at least client MAC addresses and timestamps. Entries may be aged out of the table, for example after a predetermined time such as 30 seconds. Whenever the AP receives a blacklist report from the report process, the AP adds clients and timestamps to its blacklist table, or updates the timestamp for a client entry of a client MAC address is already present in the table. This blacklist table is used to influence clients away from the AP/BSS that is not appropriate, as determined by the report process.

As an example, when the AP receives a probe request from a client that is on the blacklist and has not aged out, the AP does not send a probe response.

When an AP receives an AUTH request from a client on the blacklist that has not aged out, the AP may choose to not respond, or it may respond with a response code indicating the AP/BSS is loaded or full and cannot accept more connections.

When an AP receives an Assoc Request from a client on the blacklist that has not aged out, the AP sends an Assoc Response indicating that the AP/BSS is loaded or full and cannot accept more connections.

In addition to the embodiment of producing and propagating client blacklists for non-candidate APs, the report process may also generate and propagate client whitelists to corresponding client APs. In the case of a whitelist, an AP only responds to clients which are on the whitelist.

It should be understood that the steps and processes of the present invention are performed in a plurality of APs on a wireless network, with the report process being hosted on a suitable device on the network such as a controller, a dedicated host, or an access point. Similarly, the client device may be a laptop or desktop computer, tablet, handheld device, or fixed-function device capable of performing the methods described herein.

The present invention may be realized in hardware, software, or a combination of hardware and software. A typical combination of hardware and software may be a network server or access point with a computer program that, when being loaded and executed, controls aspects of the access point and the report process such that they carry out the methods described herein.

The present invention also may be embedded in nontransitory fashion in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

We claim:

1. A method comprising:
   collecting, by a network device, from a plurality of access points in a wireless local area network (WLAN) client data for a particular client device, the client data comprising at least a set of time-weighted signal strength values for a plurality of wireless signals received from the particular client device by a respective access point in the plurality of access points;
   aggregating, by the network device, the client data for the particular client device collected from the plurality of access points in the WLAN;
   selecting, by the network device, at least one access point from the plurality of access points to provide network access to the particular client device based on the set of time-weighted signal strength values in the client data, wherein the selected at least one access point having received from the particular client device a wireless signal with a signal strength value above a predetermined threshold within a predetermined time period;
   instructing, by the network device, the at least one access point to provide the network access to the particular client device; and
   instructing, by the network device, a subset of the plurality of access points that does not include the at least one access point to refrain from responding to connection requests received from the particular client device;
   inferring, by the network device, an operating band capability of the particular client device based on an Organizationally Unique Identifier (OUI) portion of a Media Access Control (MAC) address uniquely corresponding to the particular client device; and
   selecting, by the network device, the at least one access point from the plurality of access points to provide network access to the particular client device based on the inferred operating band capability of the particular client device and operating bands of each of the plurality of access points.

2. The method of claim 1, further comprising:
   selecting, by the network device, the at least one access point from the plurality of access points to provide the network access to the particular client device based on a number of client devices associated with each of the plurality of access points.

3. The method of claim 1, further comprising:
   selecting, by the network device, the at least one access point from the plurality of access points to provide the network access to the particular client device based on a channel utilization measurement associated with each of the plurality of access points.

4. The method of claim 1, further comprising:
   creating, by the network device, a blacklist report for a respective access point, the blacklist report including a plurality of client devices to which the respective access point is not selected to provide the network access; and
   transmitting, by the network device, the blacklist report to the respective access point to cause the access point to refrain from responding to connection requests received from the plurality of client devices.

5. The method of claim 1, further comprising:
   receiving, by the network device, an updated client data for the particular client device from a plurality of access points in a wireless local area network (WLAN); and
   selecting, by the network device, a second and different access point from the plurality of access points to provide the network access to the particular client device based on the updated client data.

6. The method of claim 1, further comprising:
   receiving, by the network device, an updated client data for the particular client device from a plurality of access points in a wireless local area network (WLAN);
   updating, by the network device, a blacklist report for a respective access point, the blacklist report including a plurality of client devices to which the respective access point is not selected to provide the network access; and
   transmitting, by the network device, the updated blacklist report to the respective access point to cause the access point to refrain from responding to connection requests received from the plurality of client devices.

7. A system comprising:
   a memory;
   a processor executing instructions stored in the memory to:
   collect from a plurality of access points in a wireless local area network (WLAN) client data for a particular client device, the client data comprising at least a set of time-weighted signal strength values for a plurality of wireless signals received from the particular client device by a respective access point in the plurality of access points;
   aggregate the client data for the particular client device collected from the plurality of access points in the WLAN;
   select at least one access point from the plurality of access points to provide network access to the particular client device based on the set of time-weighted signal strength values in the client data, wherein the selected at least one access point having received from the particular client device a wireless signal with a signal strength value above a predetermined threshold within a predetermined time period;
   instruct the at least one access point to provide the network access to the particular client device; and instruct a subset of the plurality of access points that does not include the at least one access point to refrain from responding to connection requests received from the particular client device;

infer an operating band capability of the particular client device based on an Organizationally Unique Identifier (OUI) portion of a Media Access Control (MAC) address uniquely corresponding to the particular client device; and select the at least one access point from the plurality of access points to provide the network access to the particular client device based on the inferred operating band capability of the particular client device and operating bands of each of the plurality of access points.

8. The system of claim 7, wherein the processor further executes the instructions stored in the memory to:

select the at least one access point from the plurality of access points to provide the network access to the particular client device based on a number of client devices associated with each of the plurality of access points.

9. The system of claim 7, wherein the processor further executes the instructions stored in the memory to:

select the at least one access point from the plurality of access points to provide the network access to the particular client device based on a channel utilization measurement associated with each of the plurality of access points.

10. The system of claim 7, wherein the processor further executes the instructions stored in the memory to:

create a blacklist report for a respective access point, the blacklist report including a plurality of client devices to which the respective access point is not selected to provide the network access; and transmit the blacklist report to the respective access point to cause the access point to refrain from responding to connection requests received from the plurality of client devices.

11. The system of claim 7, wherein the processor further executes the instructions stored in the memory to:

receive an updated client data for the particular client device from a plurality of access points in a wireless local area network (WLAN); and select a second and different access point from the plurality of access points to provide the network access to the particular client device based on the updated client data.

12. The system of claim 7, wherein the processor further executes the instructions stored in the memory to:

receive an updated client data for the particular client device from a plurality of access points in a wireless local area network (WLAN);

update a blacklist report for a respective access point, the blacklist report including a plurality of client devices to which the respective access point is not selected to provide the network access; and transmit the updated blacklist report to the respective access point to cause the access point to refrain from responding to connection requests received from the plurality of client devices.

13. A non-transitory machine readable medium comprising instructions which, when executed by at least one hardware processor on a network device, causes performance of operations comprising:

collecting from a plurality of access points in a wireless local area network (WLAN) client data for a particular client device, the client data comprising at least a set of time-weighted signal strength values for a plurality of wireless signals received from the particular client device by a respective access point in the plurality of access points;

aggregating the client data for the particular client device collected from the plurality of access points in the WLAN;

selecting at least one access point from the plurality of access points to provide network access to the particular client device based on the set of time-weighted signal strength values in the client data, wherein the selected at least one access point having received from the particular client device a wireless signal with a signal strength value above a predetermined threshold within a predetermined time period;

instructing the at least one access point to provide the network access to the particular client device; and instructing a subset of the plurality of access points that does not include the at least one access point to refrain from responding to connection requests received from the particular client device;

infering an operating band capability of the particular client device based on an Organizationally Unique Identifier (OUI) portion of a Media Access Control (MAC) address uniquely corresponding to the particular client device; and selecting the at least one access point from the plurality of access points to provide the network access to the particular client device based on the inferred operating band capability of the particular client device and operating bands of each of the plurality of access points.

14. The non-transitory machine readable medium of claim 13, wherein the operations further comprise:

selecting the at least one access point from the plurality of access points to provide the network access to the particular client device based on a number of client devices associated with each of the plurality of access points.

15. The non-transitory machine readable medium of claim 13, wherein the operations further comprise:

selecting the at least one access point from the plurality of access points to provide the network access to the particular client device based on a channel utilization measurement associated with each of the plurality of access points.

16. The non-transitory machine readable medium of claim 13, wherein the operations further comprise:

creating a blacklist report for a respective access point, the blacklist report including a plurality of client devices to which the respective access point is not selected to provide the network access; and transmitting the blacklist report to the respective access point to cause the access point to refrain from responding to connection requests received from the plurality of client devices.

17. The non-transitory machine readable medium of claim 13, wherein the operations further comprise:

receiving an updated client data for the particular client device from a plurality of access points in a wireless local area network (WLAN);

selecting a second and different access point from the plurality of access points to provide the network access to the particular client device based on the updated client data;

updating a blacklist report for a respective access point, the blacklist report including a plurality of client devices to which the respective access point is not selected to provide the network access; and transmitting the updated blacklist report to the respective access point to cause the access point to refrain from responding to connection requests received from the plurality of client devices.

\* \* \* \* \*